United States Patent [19]

Owens

[11] 4,298,140

[45] Nov. 3, 1981

[54] NEWSPAPER AND MAGAZINE VENDING MACHINE

[76] Inventor: Walter K. Owens, P.O. Box 1032, Crestview, Fla. 32536

[21] Appl. No.: 140,986

[22] Filed: Apr. 17, 1980

Related U.S. Application Data

[63] Continuation-in-part of Ser. No. 14,920, Feb. 26, 1979, Pat. No. 4,239,127.

[51] Int. Cl.[3] .............................................. B65G 59/08

[52] U.S. Cl. ...................................... 221/232; 221/227

[58] Field of Search ............... 221/259, 232, 227, 277, 221/213, 225; 271/30 A, 129

[56] References Cited

U.S. PATENT DOCUMENTS 3,180,518 4/1965 Roser ................................. 221/227

*Primary Examiner*—Stanley H. Tollberg

*Attorney, Agent, or Firm*—B. P. Fishburne, Jr.

[57] ABSTRACT

Newspapers of substantially any thickness are delivered one at a time in succession to customers with the assistance of gravity following the placing of proper coins into the coin control mechanism of the machine and pulling a dispensing lever toward a newspaper delivery position. The dispensing lever is coupled through a linkage with an individual newspaper elevating device which lifts the folded edge of each newspaper above the upper edge of a retaining plate. Immediately after such lifting, the same linkage releases a clamp member adjacent to the top edge of the newspaper so that the paper can free-fall along a slide to a customer pick-up station. Thinner newspapers can be handled in the machine by a friction roller lift mechanism.

12 Claims, 10 Drawing Figures

FIG. 1
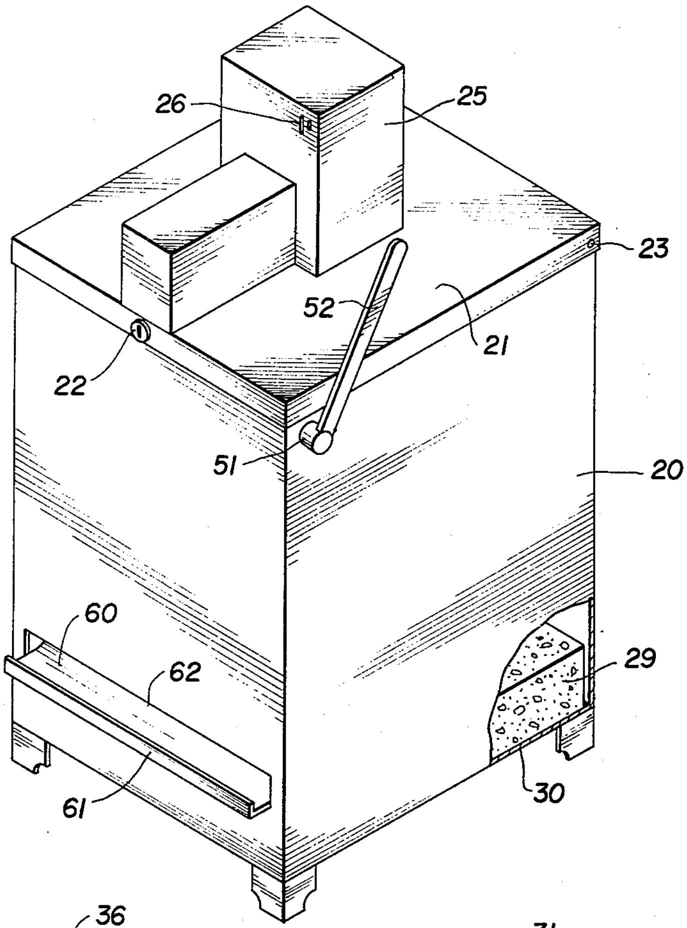
FIG. 4
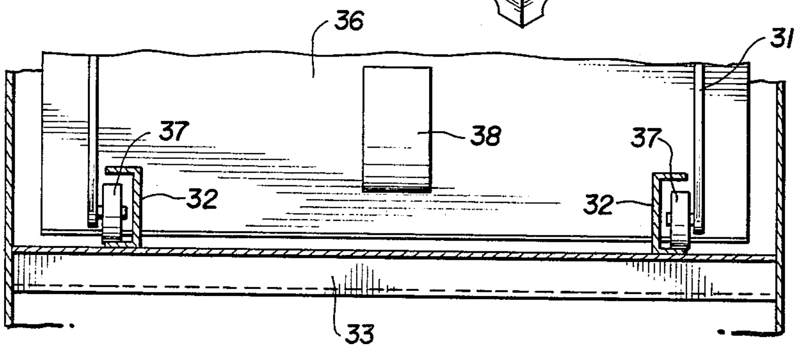
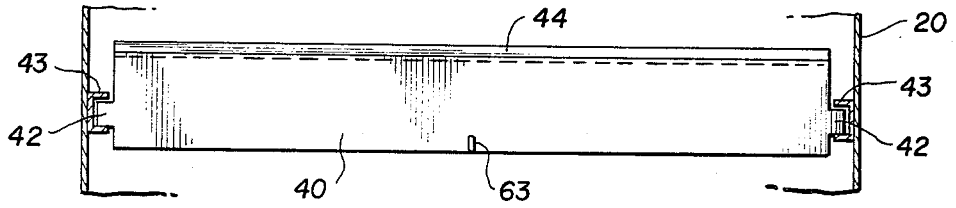
FIG. 5

FIG. 3
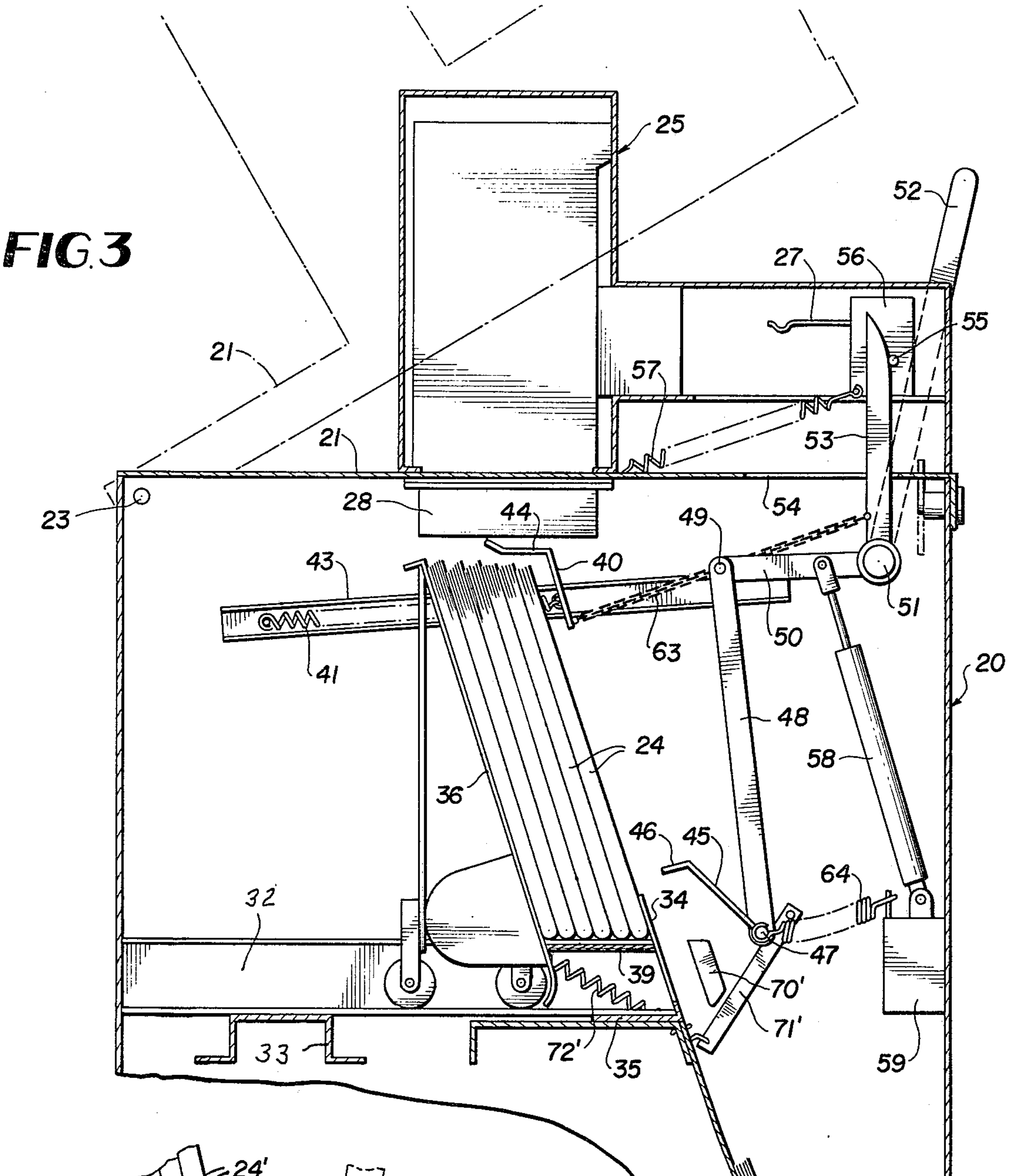
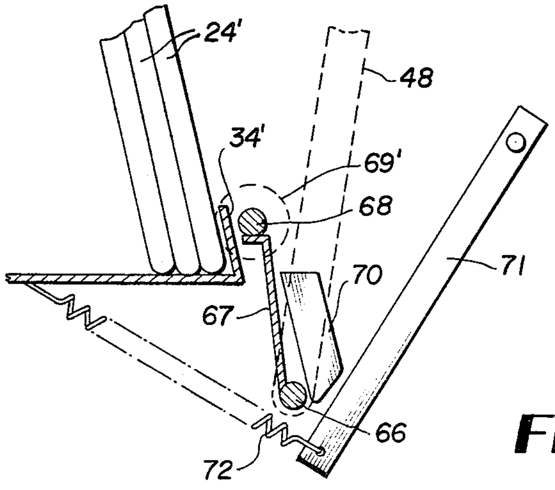
FIG. 6

FIG.7
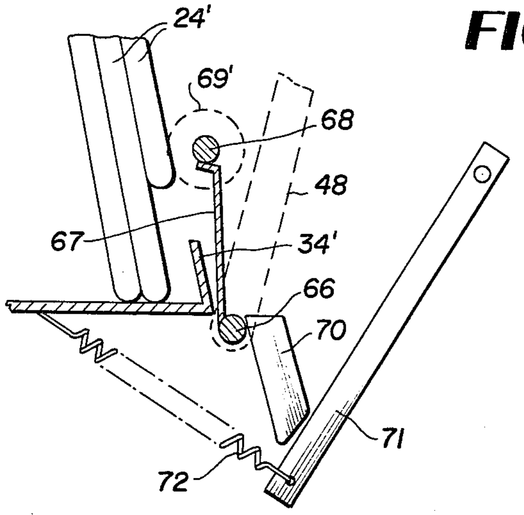
FIG.8
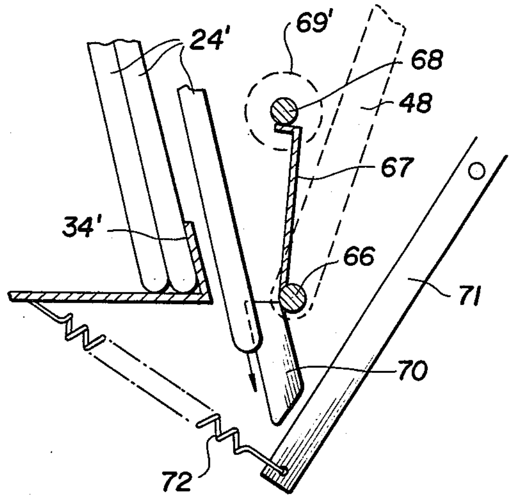
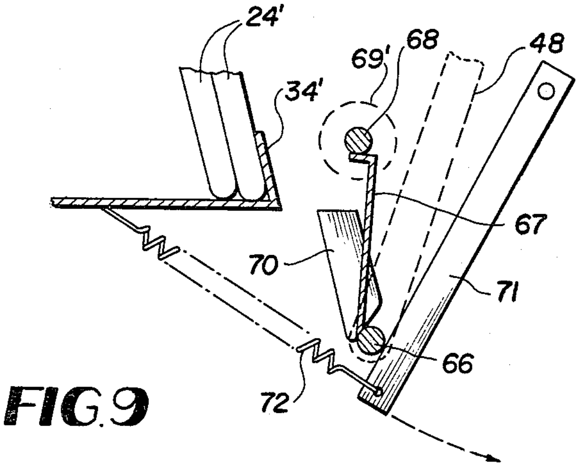
FIG.9
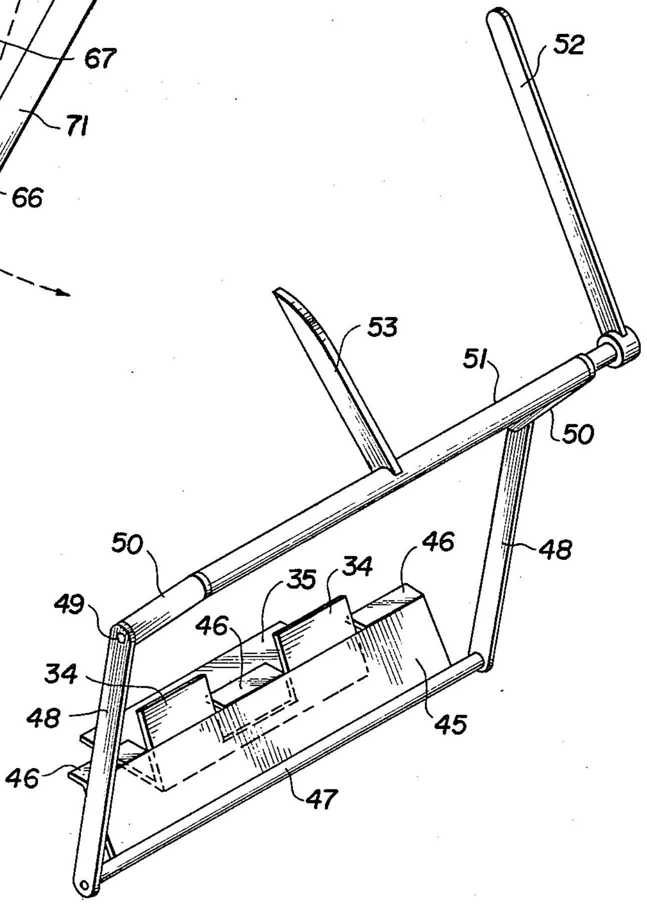
FIG.10

NEWSPAPER AND MAGAZINE VENDING MACHINE

CROSS-REFERENCE TO RELATED APPLICATION

This application is a continuation-in-part of prior copending application Ser. No. 014,920, filed Feb. 26, 1979, for NEWSPAPER VENDING MACHINE now U.S. Pat. No. 4,239,127.

BACKGROUND OF THE INVENTION

The objective of the present invention is to improve on and simplify the construction and operation of the newspaper vending machine disclosed in the above-referenced prior application, particularly in terms of enabling the machine to handle newspapers of varying thicknesses including large Sunday newspapers in major cities which are commonly several inches thick. The mechanism in the referenced application, while very efficient in dispensing newspapers up to about one inch thick, is somewhat lacking in its ability to handle newspapers averaging two or more inches in thickness.

A further objective is to provide a newspaper dispensing mechanism which is less costly to manufacture and more reliable in operation than other prior art types.

Another object is to provide a machine of maximum convenience to the customer by eliminating the necessity for opening any door or retracting any slide manually. The present invention requires only a single pulling and release of one hand level after the deposit of proper coins into a standard coin control device on the cabinet of the machine. The hand lever is returned by spring means to its normal ready position and its return movement is retarded to allow adequate time for each newspaper to fall to the delivery station and also to resist damaging the hand lever linkage under rough usage by customers.

Other features and advantages of the invention will become apparent to those skilled in the art during the course of the following detailed description.

BRIEF DESCRIPTION OF THE DRAWINGS

FIG. 1 is a perspective view of a newspaper and magazine vending machine according to the invention.

FIG. 3 is a view similar to FIG. 2 showing the dispensing mechanism in a newspaper dispensing position.

FIG. 4 is an enlarged fragmentary vertical section taken on line 4—4 of FIG. 2.

FIG. 5 is a similar view taken on line 5—5 of FIG. 2.

FIGS. 6 through 9 are fragmentary sectional views showing a modification of the invention and its operational cycle.

FIG. 10 is a fragmentary perspective view of a newspaper lifting mechanism associated with the manual dispensing lever.

DETAILED DESCRIPTION

Figure 2:
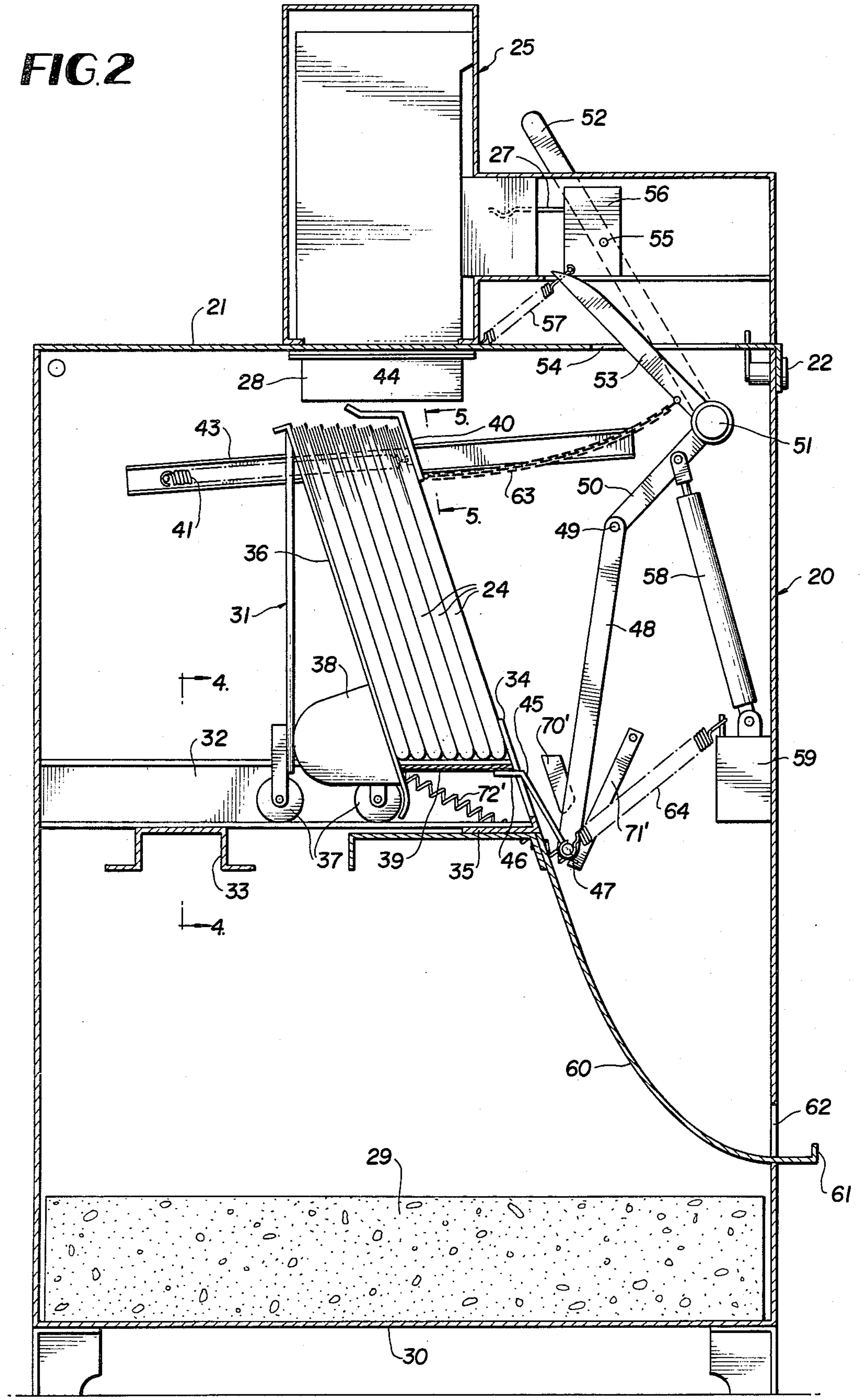
FIG. 2 is an enlarged side elevation thereof, partly in section.

Referring to the drawings in detail wherein like numerals designate like parts, a vending machine for newspapers and magazines includes an upright rectangular cabinet 20 having a hinged cover 21 provided with locking means 22 enabling the cover to be locked in the closed position. As shown in phantom lines in FIG. 3, the cover can be raised on the axis of hinge means 23 to facilitate loading newspapers 24 or magazines into the machine at required times.

Fixed on the hinged cover 21 is a standard coin mechanism 25 having coin receptor slots 26 and an internal control element 27 normally held in locked position shown in FIG. 2 and being movable to the released position shown in FIG. 3 after the deposit of proper coins in the mechanism. The coin mechanism per se is well known and need not be further described for a proper understanding of this invention. Essentially the same mechanism is disclosed in U.S. Pat. No. 4,174,047 including a releasable control element 23 corresponding to the element 27 in this application. The coin mechanism 25 includes the usual removable coin collection receptacle 28. For stability, the cabinet 20 is weighted with a heavy slab 29 of concrete on its bottom wall 30.

Centrally within the cabinet 20 is arranged a stationary horizontal back-to-front guideway for a newspaper advancing carriage 31. This guideway consists of spaced parallel channel tracks 32 supported by an underlying support member 33 attached to the side walls of the cabinet 20. The bottom folded edges of the newspapers 24 rest slidably on the channel tracks 32.

At the forward end of tracks 32, a fixed steeply inclined newspaper retainer wall. 34 is provided rising from a horizontal plate 35 beneath the tracks 32. The retainer wall 34 shown in FIGS. 2, 3 and 10 overlaps only the bottom two inches or so of the newspapers 24 which are also inclined and resting against an inclined carriage front plate 36.

The carriage 31 has wheels 37 which roll in the channel tracks 32, FIG. 4, and further includes a spring-powered unit 38 including a spool-mounted cable 39 extending ahead of the unit 38 and attached to the fixed member or plate 34. As the newspapers 24 are dispensed one at a time to customers and the stack diminishes, the spring unit 38 maintains pressure on the rear of the stack through the plate 36 and the forwardmost newspaper is always held firmly against the retainer plate 34.

Near the top unfolded edges of the newspapers 24, a yielding pressure is maintained against the upper edge portion of the forwardmost newspaper down to a point approximately two or three inches below its top edge by a transverse inclined pressure plate 40 biased rearwardly by spring means 41. End tonques 42 on the pressure plate 40 are guided by slightly inclined channel tracks 43 fixed to the side walls of cabinet 20, FIG. 5. The pressure plate 40 carries a rear horizontal extension or flange 44 to prevent upward displacement of the top edges of newspapers 24.

A key element of the invention resides in a transverse individual newspaper lifting plate 45 having rearward horizontal ears 46 along its top edge which interfit with the separated portions of plate 34, as best shown in FIG. 10. Lifting plate 45 is fixed at its lower edge to a transverse rod 47 carried by the lower ends of links 48, having their upper ends pivotally attached at 49 to shorter crank arms 50, in turn attached to a transverse rocker shaft 51 having its opposite ends suitably journaled and supported on the side walls of cabinet 20.

A customer hand lever 52 is fixed to one end of rocker shaft 51 near and outwardly of one side wall of the cabinet. A somewhat shorter camming arm 53 is fixed to the rocker shaft 51 near its midpoint and projects upwardly through a top wall slot 54 into the housing of the coin mechanism to engage a follower element 55 projecting from one side of the slidable block 56 which carries the lockable control element 27 of the standard coin mechanism 25 which is released for forward movement under influence of the hand lever 52 when proper coins are deposited in slots 26. The control element 27 and block 56 are biased rearwardly to the normal locked position shown in FIG. 2 by spring means 57.

A retarder cylinder 58 similar to a household door closer is coupled between a stationary element 59 on the front wall of cabinet 20 and at least one crank arm 50, as shown. The purpose of this retarder is to slow the automatic return of hand lever 52 and associated parts to their positions shown in FIG. 2 so that adequate time is allowed for each dispensed newspaper 24 to gravitate down a stationary slide plate 60 to a ledge 61 forwardly of a front wall outlet opening 62 defining the customer pick-up station of the machine.

A very important feature of the dispensing mechanism is the provision of a non-stretchable flexible element 63 such as a chain or cable between the camming arm 53 and pressure plate 40. This chain or cable has a precise length and remains slack during the forward swing of hand lever 52 and camming arm 53 until immediately after the lower folded edge of each leading newspaper 24 is elevated above the upper edge of inclined retaining plate 34. Only after complete elevation of the lower edge of each newspaper does the flexible element 63 become taut as shown in FIG. 3 and pull the clamping plate 40 forwardly along tracks 43 and against the force of spring means 41 to release the top edge portion of the newspaper for a free fall along slide plate 60 to the customer pick-up station 61–62. When the hand lever 52 is subsequently released for automatic return to the position in FIG. 2, the spring means 41 immediately returns clamping plate 40 to its active newspaper clamping position.

The lower ends of links 48 and connecting rod 47 are floatingly arranged in the cabinet 20 under the biasing influence of a spring means 46 attached to the anchor element 59. A fixed trapezoidal guide plate or cam 70′ in the cabinet guides the connecting rod 47 in a continuous circuit around the marginal edge of this cam when the linkage is operated by a customer. A cooperating pivoted retainer bar 71′ biased by a spring 72′ toward the cam 70′ assures contact of the rod 47 with the cam at the lower edge of the cam where separation might otherwise occur in the operation of the linkage.

During movement of the hand lever 52 forwardly by a customer, the connecting rod 47 and attached newspaper lifting plate 45 rises along the longer edge of cam 70′ so that the ears 46 will engage and elevate the lower folded edge of the forwardmost newspaper 24 in the stack to an elevation above the top edge of retaining plate 34 while the upper clamping plate 40 remains active.

Upon release of the hand lever 52 by the customer following the dispensing of one newspaper, the floating rod 47 will be guided downwardly along the shorter longitudinal edge of the cam 70′ and around the bottom of the cam while the retainer bar 71′ maintains contact between the rod and cam, as explained above. Thus the rod 47 follows a circuit around the stationary cam 70′ during each dispensing actuation of the linkage by a customer. When the hand lever 52 is in the released biased position shown in FIG. 2, the lifting ears 46 are below the lower folded edge of the next forwardmost newspaper 24 shown in FIG. 2. FIG. 3 shows the elements 45, 46 and 47 after release of the lower folded edge of one newspaper 24 which has gravitated on the slide 60 to the customer pick-up station. The rod 47 has not yet returned to its starting position in FIG. 2.

By operation of the machine in the described manner, newspapers 24 are reliably dispensed one at a time regardless of the thickness of the newspapers including the very thick and heavy Sunday papers. The mechanism is inexpensive, sturdy and durable as well as substantially foolproof.

When newspapers of only one inch thickness or less are being handled, the machine can be modified in accordance with FIGS. 6 through 9 to eliminate positive lifting plate 45 and ears 46, and to replace these elements by a lifting friction roller arrangement. Referring to FIGS. 6 through 9, the comparatively thin newspapers 24′ have their lower folded edges disposed behind an inclined retainer plate 34′ similar to the retainer plate 34. The previously-described links 48 carry a transverse rod 66 similar to the rod 47 at their lower ends and rigid therewith. This rod has a rigidly attached upwardly extending plate 67 thereon, in turn fixed to a horizontal transverse shaft 68 on which the newspaper lift roller 69′ is journaled. This roller contains a conventional one-way active, one-way freewheeling clutch, not shown, enabling the roller to resist rotation while traveling upwardly on the front face of the forwardmost newspaper 24′, whereby the locked roller 69′ will frictionally lift the forwardmost newspaper 24′ above the top of plate 34′, enabling the newspaper to drop and transverse the slide 60 in the same manner shown in FIG. 3. The roller 69′ can freewheel in the reverse direction.

The cycle of operation of the roller 69′ under influence of the hand lever 52 and associated linkage is depicted in FIGS. 6 through 9. FIG. 6 shows the lifting roller 69′ initially engaging the forwardmost newspaper 24′ through slots in the retainer plate 34′, FIG. 10. FIG. 7 shows the forwardmost newspaper 24′ elevated by the roller 69′ above retainer plate 34′ and FIG. 8 shows the forwardmost newspaper free-falling toward delivery chute 60 after being released by roller 69′. FIG. 9 shows the roller 69′ and associated parts returning toward the position in FIG. 6 for engaging and elevating the next newspaper 24′.

In the operational cycle of the roller 69′, it is guided through sliding engagement of the transverse rod 66 with the margin of a stationary trapezoidal guide plate or cam 70 in a continuous circuit of the rod around this cam through the positions of the rod shown in FIGS. 6 to 9. A cooperating pivoted retainer bar 71 is biased by a spring 72 toward the rod 66 at the bottom of the cam 70 to assure contact of the rod with the cam at this point where separation would otherwise occur. The rod 66, attached plate 67, and roller 69′ moves through this circuitous path around the margin of cam 70 whenever the hand lever 52 is pulled forwardly by a customer and released after the depositing of proper coins.

The construction and mode of operation of the remainder of the machine remains unchanged from that described already in connection with FIGS. 1–5 and need not be repeated.

It is to be understood that the forms of the invention herewith shown and described are to be taken as preferred examples of the same, and that various changes in the shape, size and arrangement of parts may be resorted to, without departing from the spirit of the invention or scope of the subjoined claims.

I claim:

1. A vending machine for newspapers and the like comprising a cabinet including a coin mechanism having a normally locked control element which is released by insertion of proper coins in the coin mechanism, a newspaper carriage horizontal guideway in the cabinet, a newspaper carriage mounted for movement on the guideway including means biasing the carriage forwardly toward the front of the cabinet, a retainer plate at the front of the guideway lapping the lower folded edge portion of the leading newspaper held against the retainer plate by the carriage, a gravity delivery chute for newspapers depending from the forward end of the guideway and leading to a delivery opening in the front of the cabinet below the guideway, a leading newspaper clamping plate in the cabinet above the elevation of said retaining plate and overlapping the top edge portion of each leading newspaper advanced by the carriage and exerting holding pressure thereon, resilient means biasing said clamping plate rearwardly toward the front face of the leading newspaper, a newspaper lifting plate in the cabinet near the forward end of said carriage guideway and adapted cyclically to engage the bottom folded edge of each leading newspaper and lift such edge above the top of the retainer plate and then release it so that each leading newspaper may free-fall onto said delivery chute, a manual linkage in the cabinet operatively connected with said lifting plate including a hand lever arranged exteriorly of the cabinet and operated by customers, said linkage including an arm within the cabinet to engage and move the control element of the coin mechanism after release thereof, and said linkage further including a substantially unstretchable flexible element attached to said clamping plate and becoming taut to relieve the pressure of the clamping plate on each leading newspaper only after said lifting plate has lifted the lower folded edge of each newspaper above the top of said retainer plate.

2. A vending machine for newspapers and the like as defined in claim 1, and positive stationary guide means in the cabinet for said newspaper lifting plate causing it to travel cyclically on a lifting and release circuit in the cabinet responsive to operation of said hand lever.

3. A vending machine for newspapers and the like as defined in claim 2, and said guide means including a stationary cam element around whose margin said lifting plate is guided on a circuitous path by each operation and release of said hand lever, and resilient biasing means in the cabinet connected with said lifting plate to maintain the latter engaged with the margin of said cam element.

4. A vending machine for newspapers and the like as defined in claim 1, and guide track means in said cabinet attached to side walls of the cabinet for guiding said clamping plate during its movement in a fore and aft direction.

5. A vending machine for newspapers and the like as defined in claim 1, and said retainer plate extending transversely in the cabinet and being steeply inclined relative to the horizontal in a rearward direction and projecting above the top of said guideway on which the lower folded edges of newspapers rest while in the cabinet, said carriage having a steeply inclined front wall substantially parallel to the retainer plate and engaging the trailing newspaper of a plurality of newspapers in the cabinet and exerting forward pressure thereon.

6. A vending machine for newspapers and the like as defined in claim 1, and said newspaper clamping plate being inclined and parallel to the retainer plate and having a top substantially horizontal rear extension closely overlying the top unfolded edge of at least the leading newspaper in said cabinet to preclude substantial upward displacement of such edge.

7. A vending machine for newspapers and the like as defined in claim 1, and spring return means in said cabinet for said manual linkage.

8. A vending machine for newspapers and the like as defined in claim 1, and a fluid retarder device in said cabinet attached to said linkage to retard the return travel thereof after said hand lever is released by a customer.

9. A vending machine for newspapers and the like as defined in claim 1, and said cabinet including a hinged top cover which is lockable in a closed position, said coin mechanism being mounted on the hinged top cover.

10. A vending machine for newspapers and the like as defined in claim 1, and said manual linkage including a stationary transverse axis rocker shaft in said cabinet above and forwardly of said guideway, said hand lever and said arm being directly attached to the rocker shaft.

11. A vending machine for newspapers and the like as defined in claim 10, and said linkage further comprising crank arms in said cabinet attached to the rocker shaft and turning therewith, a pair of links pivotally attached to the crank arms, a transverse axis rod connected to and carried by said links, and said newspaper lifting plate being attached to said transverse axis rod.

12. A vending machine for newspapers and the like as defined in claim 1, and said retainer plate including spaced plate sections, said lifting plate including spaced ears in interdigitating relationship with the spaced sections of the retainer plate during the lifting of each newspaper by said lifting plate.

* * * * *